United States Patent
Padmanabhan et al.

(10) Patent No.: US 11,100,091 B2
(45) Date of Patent: Aug. 24, 2021

(54) LIGHTWEIGHT NODE IN A MULTI-TENANT BLOCKCHAIN NETWORK

(71) Applicant: salesforce.com, inc., San Francisco, CA (US)

(72) Inventors: Prithvi Krishnan Padmanabhan, San Ramon, CA (US); Sri Naga Deepthi Velisetti, Dublin, CA (US); Brent Fosdick, Fort Collins, CO (US); Philip Norman Calvin, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 170 days.

(21) Appl. No.: 16/228,501

(22) Filed: Dec. 20, 2018

(65) Prior Publication Data
US 2020/0089670 A1 Mar. 19, 2020

Related U.S. Application Data

(60) Provisional application No. 62/733,523, filed on Sep. 19, 2018.

(51) Int. Cl.
*G06F 16/23* (2019.01)
*G06F 16/27* (2019.01)
(Continued)

(52) U.S. Cl.
CPC .......... *G06F 16/2379* (2019.01); *G06F 16/27* (2019.01); *H04L 9/0637* (2013.01);
(Continued)

(58) Field of Classification Search
CPC ... G06F 16/2379; G06F 16/27; H04L 9/0637; H04L 67/1091; H04L 67/1097; H04L 2209/38
(Continued)

(56) References Cited

U.S. PATENT DOCUMENTS 7,730,478 B2 6/2010 Weissman
8,326,876 B1 * 12/2012 Venkataraman ...... G06F 16/252
707/784
(Continued)

FOREIGN PATENT DOCUMENTS

WO 2016161073 A1 10/2016
WO 2018007828 A2 1/2018

OTHER PUBLICATIONS

International Search Report and Written Opinion, Intl. App. No. PCT/US2019/051781, dated Dec. 10, 2019, 13 pages.
(Continued)

*Primary Examiner* — Hares Jami
(74) *Attorney, Agent, or Firm* — NDWE, LLP

(57) ABSTRACT

A method for managing data by a multi-tenant server in a distributed network is described. The multi-tenant server manages a multi-tenant environment for a set of tenant systems and peers in the distributed network, which include the set of tenant systems and a set of non-tenant systems. The method includes receiving a tenant transaction request to modify an object in the distributed network, wherein the tenant transaction request is received from a tenant system in the set of tenant systems based on a non-tenant transaction request from a non-tenant system from the set of non-tenant systems; generating, on behalf of the tenant system and the non-tenant system, a transaction object based on an exchange object and the tenant transaction request; and making, on behalf of the tenant system, the transaction object available to the sets of tenant non-tenant systems to attempt to obtain consensus for modifying the object.

20 Claims, 12 Drawing Sheets

(51) Int. Cl.
*H04L 29/08* (2006.01)
*H04L 9/06* (2006.01)

(52) U.S. Cl.
CPC ...... *H04L 67/1091* (2013.01); *H04L 67/1097* (2013.01); *H04L 2209/38* (2013.01)

(58) Field of Classification Search
USPC .......................................................... 707/703
See application file for complete search history.

(56) References Cited

U.S. PATENT DOCUMENTS

| | | | |
|---|---|---|---|
| 8,886,671 B1* | 11/2014 | Ro | G06F 16/289 707/781 |
| 9,075,889 B2 | 7/2015 | Calvin et al. | |
| 9,276,995 B2 | 3/2016 | Calvin et al. | |
| 9,317,843 B2 | 4/2016 | Bradley et al. | |
| 9,448,773 B2 | 9/2016 | Calvin et al. | |
| D768,690 S | 10/2016 | Conn | |
| 9,525,720 B2 | 12/2016 | Calvin et al. | |
| 9,572,614 B2 | 2/2017 | Calvin et al. | |
| 9,635,090 B2 | 4/2017 | Calvin et al. | |
| D800,148 S | 10/2017 | Conn | |
| 9,811,506 B2 | 11/2017 | Calvin | |
| 9,992,022 B1 | 6/2018 | Chapman et al. | |
| 10,027,735 B2 | 7/2018 | Calvin et al. | |
| 10,117,697 B2 | 11/2018 | Calvin et al. | |
| 10,212,209 B2 | 2/2019 | Calvin et al. | |
| 10,489,786 B2 | 11/2019 | Yu et al. | |
| 2002/0194501 A1 | 12/2002 | Wenocur et al. | |
| 2003/0149934 A1 | 8/2003 | Worden | |
| 2008/0034228 A1 | 2/2008 | Shear et al. | |
| 2010/0005443 A1* | 1/2010 | Kwok | G06Q 10/10 717/100 |
| 2011/0276490 A1 | 11/2011 | Wang et al. | |
| 2013/0290406 A1 | 10/2013 | Calvin et al. | |
| 2014/0122649 A1 | 5/2014 | Calvin et al. | |
| 2014/0122993 A1 | 5/2014 | Calvin et al. | |
| 2014/0304692 A1 | 10/2014 | Calvin et al. | |
| 2015/0127781 A1 | 5/2015 | Calvin et al. | |
| 2015/0348017 A1 | 12/2015 | Allmen | |
| 2015/0379510 A1 | 12/2015 | Smith | |
| 2016/0012465 A1 | 1/2016 | Sharp | |
| 2016/0021166 A1 | 1/2016 | Calvin et al. | |
| 2016/0048481 A1 | 2/2016 | Calvin | |
| 2016/0088058 A1 | 3/2016 | Calvin et al. | |
| 2016/0098723 A1 | 4/2016 | Feeney | |
| 2016/0162873 A1 | 6/2016 | Zhou et al. | |
| 2016/0164947 A1 | 6/2016 | Calvin et al. | |
| 2017/0048301 A1 | 2/2017 | Calvin et al. | |
| 2017/0140408 A1 | 5/2017 | Wuehler | |
| 2017/0178127 A1 | 6/2017 | Kravitz | |
| 2017/0252085 A1 | 9/2017 | Calvin et al. | |
| 2017/0337534 A1 | 11/2017 | Goeringer et al. | |
| 2017/0344618 A1* | 11/2017 | Horowitz | G06F 11/2097 |
| 2018/0005186 A1 | 1/2018 | Hunn | |
| 2018/0006831 A1 | 1/2018 | Toll et al. | |
| 2018/0018723 A1 | 1/2018 | Nagla et al. | |
| 2018/0173719 A1 | 6/2018 | Bastide et al. | |
| 2018/0219676 A1* | 8/2018 | Mattingly | H04L 63/08 |
| 2018/0248880 A1 | 8/2018 | Sardesai et al. | |
| 2018/0285322 A1 | 10/2018 | Calvin | |
| 2019/0005268 A1 | 1/2019 | Gupta | |
| 2019/0058709 A1 | 2/2019 | Kempf et al. | |
| 2019/0087449 A1 | 3/2019 | Rybacki et al. | |
| 2019/0179951 A1 | 6/2019 | Brunet et al. | |
| 2019/0236559 A1 | 8/2019 | Padmanabhan | |
| 2019/0236562 A1 | 8/2019 | Padmanabhan | |
| 2019/0236598 A1 | 8/2019 | Padmanabhan | |
| 2019/0236606 A1 | 8/2019 | Padmanabhan et al. | |
| 2019/0238316 A1 | 8/2019 | Padmanabhan | |
| 2019/0238525 A1 | 8/2019 | Padmanabhan et al. | |
| 2019/0303121 A1 | 10/2019 | Padmanabhan | |
| 2019/0303445 A1 | 10/2019 | Padmanabhan | |
| 2019/0377806 A1 | 12/2019 | Padmanabhan et al. | |
| 2019/0379721 A1 | 12/2019 | Calvin et al. | |
| 2020/0042939 A1 | 2/2020 | Padmanabhan | |
| 2020/0074457 A1* | 3/2020 | Coleman | G06Q 20/0655 |
| 2020/0084027 A1* | 3/2020 | Duchon | H04L 9/0825 |
| 2020/0185070 A1 | 6/2020 | Dahmani | |

OTHER PUBLICATIONS

International Search Report and Written Opinion, Intl. App. No. PCT/US2019/051782, dated Jan. 10, 2020, 12 pages.
International Search Report and Written Opinion, Intl. App. No. PCT/US2019/051783, dated Dec. 11, 2019, 11 pages.
Nakamoto, Satoshi, "Bitcoin: A Peer-to-Peer Electronic Cash System", Satoshi Nakamoto Institute, Oct. 31, 2008, 9 pages.
Xia et al., "MeDShare: Trust-Less Medical Data Sharing Among Cloud Service Providers via Blockchain" IEEE Access, vol. 5, 2017, pp. 14757-14767.
Yu et al., "Virtualization for Distributed Ledger Technology (vDLT)", IEEE Access, vol. 6, 2018, pp. 25019-25028.
International Search Report and Written Opinion for Application No. PCT/US2019/036103, dated Aug. 1, 2019, 12 pages.
Non-Final Office Action, U.S. Appl. No. 16/228,528, dated Oct. 9, 2020, 11 pages.
Non-Final Office Action, U.S. Appl. No. 16/228,555, dated Jan. 13, 2021, 13 pages.
Final Office Action, U.S. Appl. No. 16/228,528, dated Apr. 5, 2021, 13 pages.
Non-Final Office Action, U.S. Appl. No. 16/228,569, dated May 13, 2021, 15 pages.
Non-Final Rejection, U.S. Appl. No. 16/136,077, dated Jun. 9, 2021, 11 pages.
Notice of Allowance, U.S. Appl. No. 16/228,555, dated Apr. 30, 2021, 11 pages.

* cited by examiner

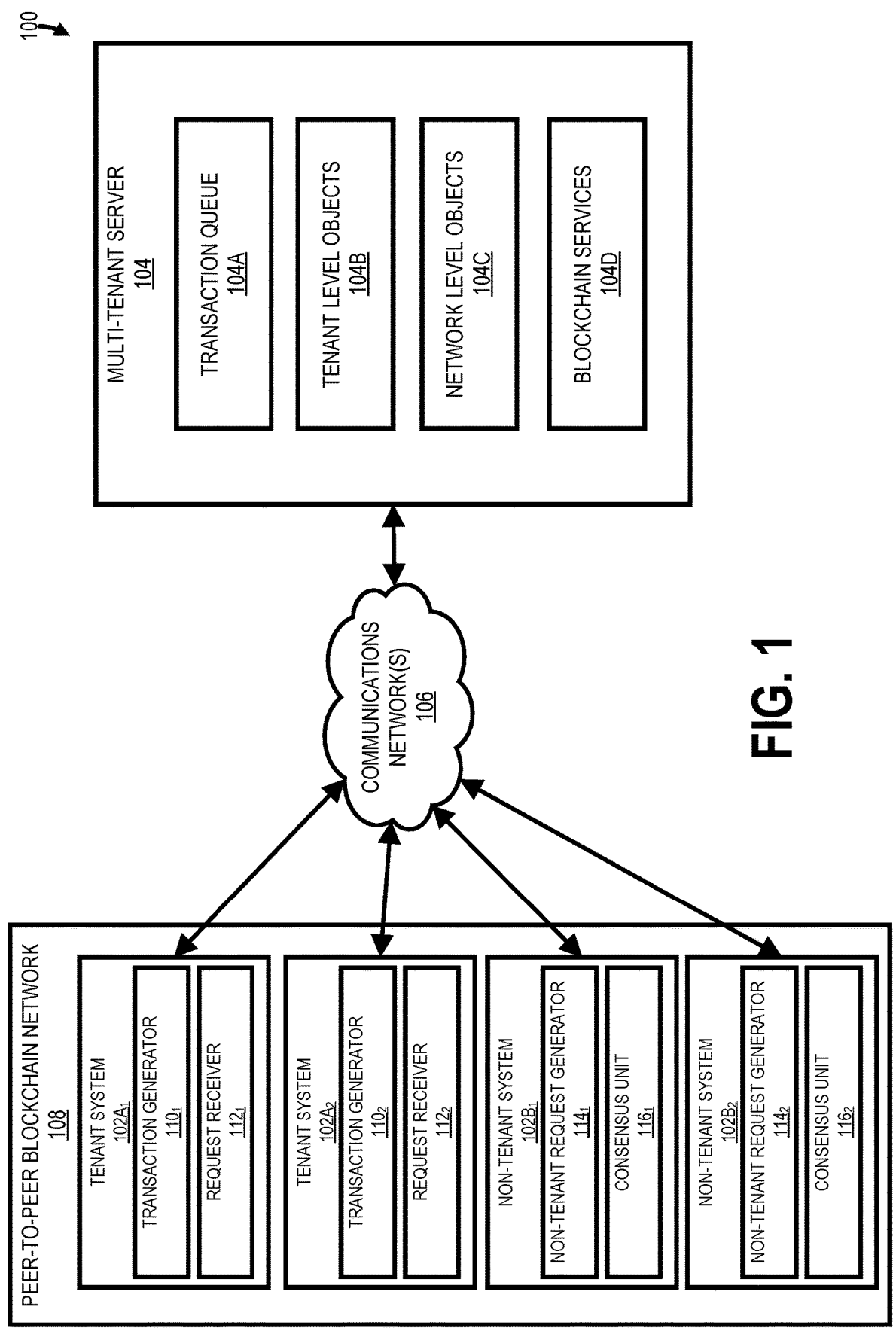

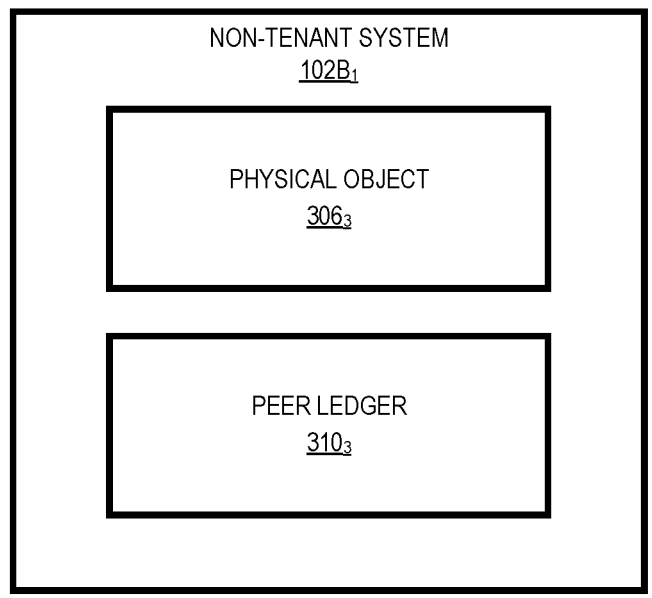
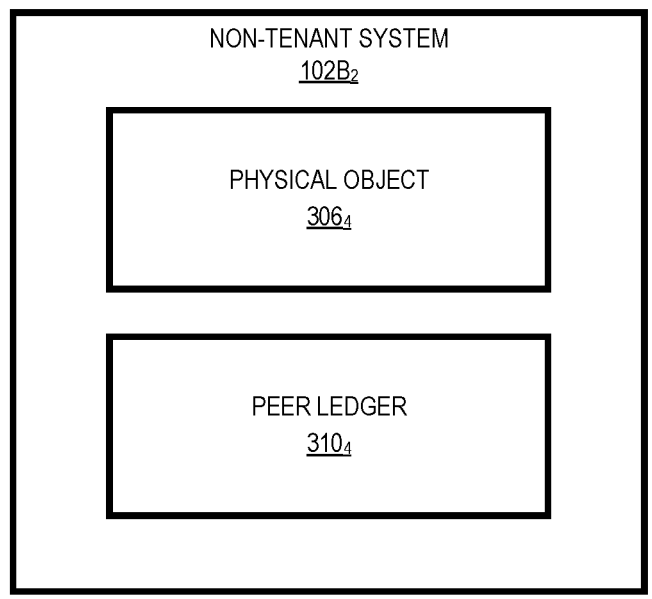
FIG. 9

LIGHTWEIGHT NODE IN A MULTI-TENANT BLOCKCHAIN NETWORK

CROSS-REFERENCE TO RELATED APPLICATIONS

This application claims the benefit of U.S. Provisional Application No. 62/733,523, filed Sep. 19, 2018, which is hereby incorporated by reference.

TECHNICAL FIELD

One or more implementations relate to the field of data management; and more specifically, to managing a lightweight node in a multi-tenant blockchain network.

BACKGROUND

A blockchain is a continuously expanding list of records/blocks that are linked and secured using cryptography. In particular, every block in a blockchain may include a cryptographic hash of the immediately preceding block, a timestamp for the current block, and transaction data (e.g., the addition/modification of information associated with a peer in a blockchain network). Further, the blockchain may be shared and managed through a peer-to-peer network via a system of verifying/validating new blocks to be added to the chain such that a block in a blockchain cannot be altered without alteration of all subsequent blocks, which requires network consensus. This architecture allows for security of information stored within blocks through the use of cryptography; sharing/distribution of information through the use of peer-to-peer networks; trust through the use of consensus of block addition; and immutability of information stored within blocks through the use of cryptography, chaining/linking of blocks, and peer distribution (e.g., each peer in the blockchain network may maintain a ledger of all verified/validated transactions in the network).

In contrast to a blockchain architecture, a multi-tenant cloud architecture relies on centralization of information in a common database or other data structure. Although cloud-based architectures provide many benefits in comparison to blockchain architectures, including the ability to remove many management functions from tenants and instead focus these functions on a centralized system, these architectures do not provide the same level of security, trust, and immutability of information during inter-tenant communications of data.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

FIG. 1 shows a block diagram illustrating a computing environment, including a multi-tenant server, according to one example implementation.

FIG. 9 shows an example of physical objects and peer-ledgers of non-tenant systems, according to one example implementation.

DETAILED DESCRIPTION

Figure 2A:
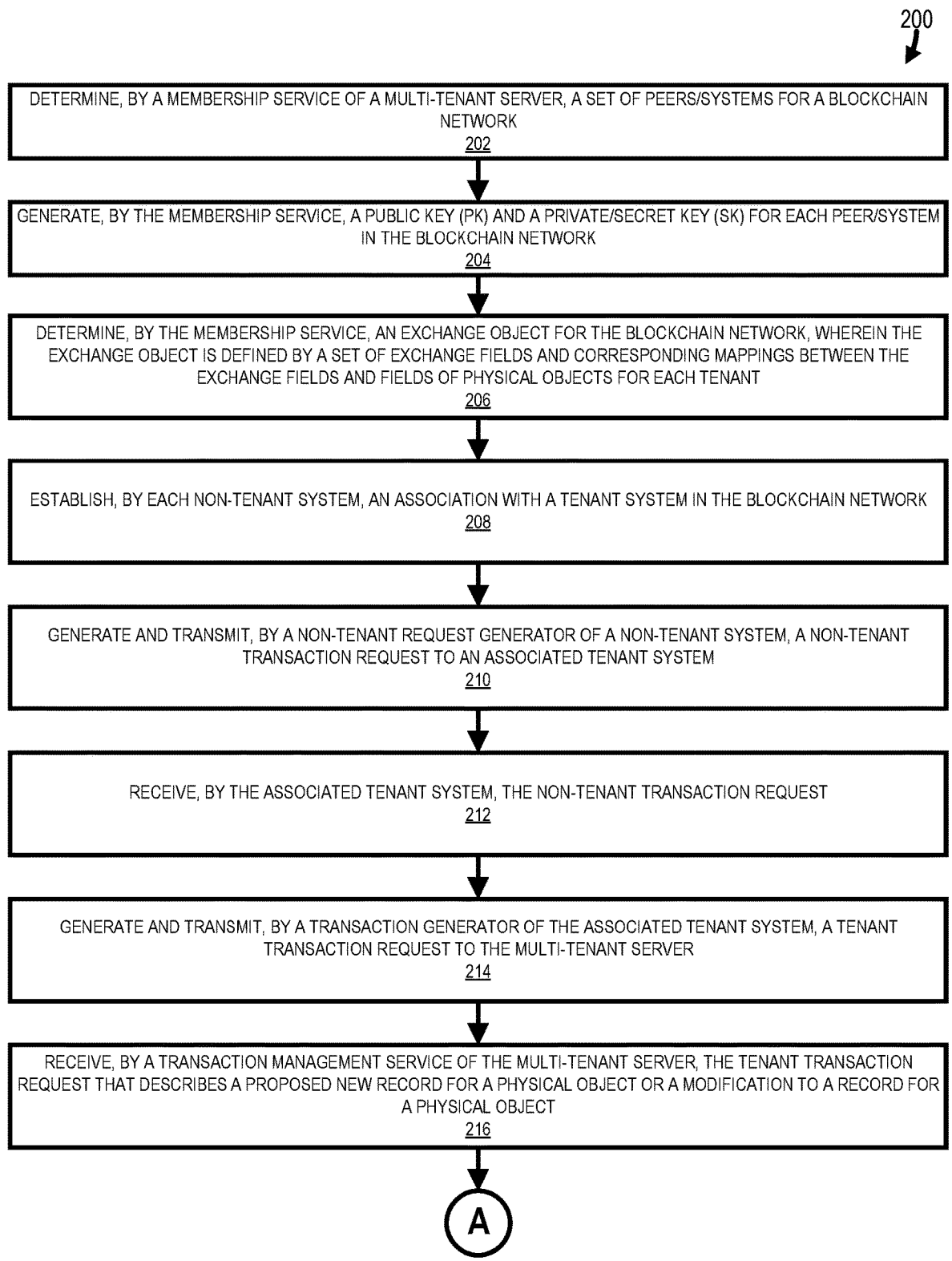
FIGS. 2A and 2B show a method for the multi-tenant server to manage data in a peer-to-peer blockchain network with both tenant systems and non-tenant systems, according to one example implementation.

FIG. 1 is a block diagram illustrating a computing environment 100, according to one example implementation. The computing environment 100 includes systems 102A and 102B, a multi-tenant server 104, and a set of communications networks 106. In this example computing environment 100, the systems 102A and 102B may be part of a peer-to-peer blockchain network 108 and the multi-tenant server 104 provides a cloud environment to manage data and transactions of the systems 102A and 102B in the peer-to-peer blockchain network 108 via a transaction queue 104A, tenant level objects 104B, network level objects 104C, and blockchain services 104D. In the configuration shown in FIG. 1, the peer-to-peer blockchain network 108 includes both tenant systems 102A (e.g., the tenant systems 102A$_1$ and 102A$_2$) and non-tenant systems 102B (e.g., the non-tenant systems 102B$_1$ and 102B$_2$).

As will be described herein, the tenant systems 102A are part of a multi-tenant environment/system that is managed by the multi-tenant server 104. For example, the multi-tenant server 104 may manage a multi-tenant database management system (DBMS) in which the users/tenants associated with the tenant systems 102A are able to store and/or retrieve data. A multi-tenant DBMS refers to those systems in which various elements of hardware and software of the DBMS may be shared by one or more tenants. For example, a given server (e.g., the multi-tenant server 104) may simultaneously process requests for a great number of tenants, and a given database table may store records for a potentially much greater number of tenants. In contrast to the tenant systems 102A, the non-tenant systems 102B are not part of a multi-tenant environment/system that is managed by the multi-tenant server 104. In particular, users of the non-tenant systems 102B have not contracted with the multi-tenant server 104 or have not signed up with the multi-tenant server 104 to participate in the multi-tenant environment/system managed by the multi-tenant server 104. Accordingly, the multi-tenant server 104 does not directly manage data for the non-tenant systems 102B and/or include portions/partitions devoted to the non-tenant systems 102B.

Although shown with four systems 102, including two tenant systems 102A (e.g., the tenant systems 102A$_1$ and 102A$_2$) and two non-tenant systems 102B (e.g., the non-tenant systems 102B$_1$ and 102B$_2$), the peer-to-peer blockchain network 108 may include any number of systems 102. In particular, the peer-to-peer blockchain network 108 may include any number of tenant systems 102A and any number of non-tenant systems 102B.

As will be described in greater detail below, a transaction generator 110 of a tenant system 102A may generate a request to (1) add/insert a new record to/into a physical object associated with the tenant system 102A or (2) modify/update an existing record of the physical object associated with the tenant system 102A. The physical object may include a set of fields for each record and is stored in a portion/partition of the tenant level objects 104B of the multi-tenant server 104 associated with the corresponding tenant system 102A such that the physical object is only accessible to the tenant system 102A (e.g., the tenant system 102A$_2$ is not permitted to read or write to the physical object of the tenant system 102A$_1$). The request may cause the addition of a record in a shadow object in the portion/partition of the tenant level objects 104B associated with the tenant system 102A. The shadow object represents uncommitted data to the physical object (i.e., data for which a consensus amongst the peers in the peer-to-peer blockchain network 108 has not yet been achieved). The shadow object may be used by the transaction queue 104A for generating a transaction object, which will be distributed/made available to the other tenant systems 102A and the non-tenant system 102B for receiving consensus for the proposed addition/modification to the physical object of the tenant system 102$_1$.

In one implementation, the set of fields of the transaction object is a subset of the fields of the physical object and the set of fields of the transaction object are defined by an exchange object, which is included in the network level objects 104C. In this implementation, the exchange object may include a set of exchange fields, which will be included in the transaction object, and each exchange field of the exchange object is mapped to a field in the physical objects of the tenant systems 102A. For example, a physical object of the tenant system 102A$_1$ may include fields A-D and a physical object of the tenant system 102A$_2$ may include fields E-H. In this example, a first exchange field of the exchange object of the peer-to-peer blockchain network 108 may be mapped to the field B of the tenant system 102A$_1$ and the field F of the tenant system 102A$_2$. Similarly, a second exchange field of the exchange object of the peer-to-peer blockchain network 108 may be mapped to the field C of the tenant system 102A$_1$ and the field E of the tenant system 102A$_2$. Accordingly, when a proposal for adding/modifying a record for the physical object of the tenant system 102A$_1$ is received, the corresponding transaction object includes the first exchange field with a value from field B of the proposed physical/shadow object and the second exchange field with a value from field C of the proposed physical/shadow object. The exchange object provides a uniform transaction object via mapping metadata for verification/validation purposes in the peer-to-peer blockchain network 108 while allowing the tenant system 102A$_1$ to only reveal particular portions of information to other tenants/peers in the peer-to-peer blockchain network 108 (e.g., sensitive information/fields in physical objects may not be included in transaction objects which are distributed amongst systems 102 in the peer-to-peer blockchain network 108 and later included in distributed ledgers).

As described herein, the multi-tenant server 104 may perform many of the functions of the peer-to-peer blockchain network 108 on behalf of the systems 102. In particular, the multi-tenant server 104 may include a virtual space/organization for each of the tenant systems 102A. Each virtual space/organization may include data and applications/services for corresponding tenant systems 102A and is logically separate from all other virtual spaces/organizations of other tenant systems 102A. For example, each virtual space/organization may include tenant level objects 104B corresponding to respective tenants/tenant systems 102A and separate instantiations of or access to blockchain services 104D. In this configuration/architecture, the virtual space/organization for each tenant system 102A may perform one or more blockchain functions/operations on behalf of the corresponding tenant system 102A. For example, in response to receipt of a request from the tenant system 102A$_1$ to add/insert a new record to or modify/update an existing record of a physical object of the tenant system 102A$_1$, the multi-tenant server 104 may generate a shadow object record in the virtual space/organization of the tenant system 102A$_1$ within the multi-tenant server 104. In response, a transaction queue 104A may generate a transaction object corresponding to the record in the shadow object using the exchange object of the peer-to-peer blockchain network 108 and a set of cryptographic keys of the tenant system 102A$_1$ such that the transaction object may be distributed or otherwise be made available to virtual spaces/organizations of the other tenant system 102A$_2$. The virtual spaces/organizations of the other tenant system 102A$_2$ may thereafter analyze the transaction object to determine whether validation/verification is appropriate.

In some implementations, the non-tenant systems 102B may contribute to consensus operations in the peer-to-peer blockchain network 108. For example, the transaction queue 104A may distribute the transaction object to the non-tenant systems 102B in addition to the tenant systems 102A. For instance, the consensus units 116$_1$ and 116$_2$ of the non-tenant systems 102B$_1$ and 102B$_2$ may respectively analyze the transaction object to determine whether validation/verification is appropriate and transmit an appropriate response to the transaction queue 104A.

The transaction queue 104A may wait for validation/verification from the virtual spaces/organizations of the tenant systems 102A and/or the consensus units 116 of the non-tenant systems 102B such that consensus for the proposed alteration to the physical object of the tenant system 102A is achieved. In response to this consensus, a virtual space/organization of a leader tenant system 102A may (1) add/insert a record or modify a record (as appropriate) in a corresponding physical object of this leader tenant system 102A and (2) add/insert a corresponding entry/block to/into a distributed ledger of this leader tenant system 102A. Thereafter, the virtual space/organization of a leader tenant system 102A may transmit a request to the virtual spaces/organizations of the other/remaining tenant systems 102A to commit the change to their physical objects (based on a mapping defined in the exchange object) and/or add a corresponding entry/block to a ledger of these other/remaining tenant systems 102A. In some implementations, the request to commit the change to physical objects and/or add a corresponding entry/block to ledgers may be forwarded by the cloud environment provided by the multi-tenant server 104 to the non-tenant systems 102B either directly or through an associated tenant system 102A. For example, each non-tenant system 102B may be paired or otherwise associated with a tenant system 102A. In this implementation, the tenant system 102A (either directly or via a virtual space provided by the multi-tenant server 104) forwards the requests to the associated non-tenant system 102B. In one implementation, the non-tenant systems 102B are only distributed a subset of the distributed ledger. For example, only a portion of the distributed ledger involving the non-tenant system 102B or necessary for the non-tenant system 102B to understand updates to physical objects associated with the non-tenant system 102B may be provided to the corresponding non-tenant system 102B.

In one implementation, the non-tenant systems 102B are not permitted to directly initiate a transaction in the peer-to-peer blockchain network 108. In particular, since the non-tenant systems 102B are not tenants in the multi-tenant environment/system managed by the multi-tenant server 104, transactions in the peer-to-peer blockchain network 108, which are managed by the multi-tenant server 104, are initiated by a tenant system 102A. Accordingly, as will be described in greater detail below, a non-tenant system 102B may transmit an initial request to generate a transaction in the peer-to-peer blockchain network 108 to one of the tenant systems 102A. For example, the non-tenant request generator $114_1$ of the non-tenant system $102B_1$ may transmit an initial/non-tenant transaction request to the tenant system $102A_2$ to generate a transaction in the peer-to-peer blockchain network 108. In this example, the non-tenant system $102B_1$ is associated with the tenant system $102A_2$. This association may be established upon the establishment of the peer-to-peer blockchain network 108 or the non-tenant system $102B_1$ joining the peer-to-peer blockchain network 108. In response to receipt of the non-tenant transaction request by the request receiver $112_2$ of the tenant system $102A_2$, the transaction generator $110_2$ of the tenant system $102A_2$ may transmit a transaction request to the multi-tenant server 104 for initiating the transaction in the peer-to-peer blockchain network 108. A virtual space/organization of the multi-tenant server 104 associated with the tenant system $102A_2$ in conjunction with other elements of the multi-tenant server 104 (e.g., the transaction queue 104A) may thereafter begin the process of generating a transaction object and attempting to obtain consensus for the transaction.

As illustrated above and as will be described in greater detail below, the cloud environment provided by the multi-tenant server 104 (e.g., the virtual spaces/organizations provided by the multi-tenant server 104) may be used for managing blockchain transactions between the systems 102, including the tenant systems 102A and the non-tenant systems 102B. Accordingly, the cloud environment implemented by the multi-tenant server 104 provides the same level of security, trust, and immutability of information as a blockchain network during inter-tenant communications while centralizing functionality/operations of the peer-to-peer blockchain network 108. Further, the computing environment 100, including the multi-tenant server 104, implements the peer-to-peer blockchain network 108 to allow participation of both tenant systems 102A and non-tenant systems 102B in the peer-to-peer blockchain network 108.

Each element of the computing environment 100 of FIG. 1 will now be described in greater detail below by way of example. In some implementations, the computing environment 100 may include more elements than those shown in FIG. 1. Accordingly, the computing environment 100 of FIG. 1 is purely for illustrative purposes.

As shown in FIG. 1 and described above, the systems 102 (e.g., the tenant systems 102A and the non-tenant systems 102B) and the multi-tenant server 104 may be connected through a set of one or more communication networks 106.

The set of one or more communication networks 106 may be, for example, a local area network (LAN), a wide area network (WAN), a global area network (GAN), such as the Internet, or a combination of such networks. In another implementation, the systems 102 and the multi-tenant server 104 may maintain a direct connection to each other via a wired or wireless medium.

Each of the systems 102 may be a computing system that may be operated by one or more users. For example, each of systems 102 may be a personal computer (PC), a workstation, a laptop computer, a tablet computer, a mobile phone, a smartphone, a personal digital assistant (PDA), or the like. As will be described in greater detail below, the systems 102 may communicate with the multi-tenant server 104 to modify/add/store and retrieve data.

The systems 102 (sometimes referred to as client, peer, or user systems) may each include a screen/display (e.g., a liquid crystal (LCD) display) for presenting an interface (e.g., a graphical user interface (GUI)) to a user, including an interface presented in a web page. As will be described in greater detail below, each of the tenant systems 102A may include a corresponding transaction generator 110 for receiving inputs from a user (e.g., via a user interface) or from a non-tenant system 102B (e.g., via a non-tenant request generator 114 of a non-tenant system 102B and a request receiver 112 of a tenant system 102A) to alter a physical object (e.g., addition of a new record in the physical object or modification of an existing record in the physical object) and triggering the process of obtaining consensus (e.g., verification/validation) from the other systems 102 in the peer-to-peer blockchain network 108 for the alteration.

The tenant systems 102A may each be associated with one or more organizations/tenants that are managed by the multi-tenant server 104. For example, users of the tenant system $102A_1$ may be customers of a first organization/tenant and a user of the tenant system $102A_2$ may be a customer of a second organization/tenant. Organizations/tenants may be any firm, corporation, institution, association, or society that has contracted with an administrator of the multi-tenant server 104 to provide users access to data stored therein via the tenant systems 102A.

In contrast to the tenant systems 102A, the non-tenant systems 102B are unassociated with an organization/tenant that is managed by the multi-tenant server 104. As will be described in greater detail below, since the non-tenant systems 102B are unassociated with an organization/tenant that is managed by the multi-tenant server 104, the non-tenant systems 102B may not be provided with or be associated with the same permissions or functionality as the tenant systems 102A. For example, the non-tenant system 102B cannot directly initiate a transaction in the peer-to-peer blockchain network 108 that is managed by the multi-tenant server 104. Instead, the non-tenant systems 102B each associate with a tenant system 102A for initiating a transaction in the peer-to-peer blockchain network 108. Accordingly, the non-tenant system 102B may include a non-tenant request generator 114 for generating and transmitting non-tenant transaction requests to an associated tenant system 102A. As will be described in greater detail below, the associated tenant system 102A may generate a tenant transaction request based on a non-tenant transaction request received from the non-tenant system 102B.

In one implementation, the multi-tenant server 104 may be any computing device that provides users access to resources via the systems 102 and the communication network(s) 106. For example, the multi-tenant server 104 may provide users of the systems 102 access to data in one or more physical objects and/or one or more corresponding distributed peer ledgers that describe changes to the physical objects. For instance, a physical object of the tenant system $102A_1$ may correspond to a medical lab report. In this example implementation, the records in the physical object may include a lab report identifier field, a patient name field, a lab network identifier field, a lab test identifier field, a patient identifier field, and a social security number field. When an alteration/change is desired to a physical object of a system 102 (e.g., addition of a new record to a physical object or modification of an existing record in a physical object), the multi-tenant server 104 uses the transaction queue 104A, the tenant level objects 104B, the network level objects 104C, and the blockchain services 104D to attempt to make these alterations in the peer-to-peer blockchain network 108 (e.g., alterations reflected in physical objects and distributed ledgers associated with the systems 102).

The multi-tenant server 104 may include various elements of hardware and software of a multi-tenant system. As used herein, the term "multi-tenant system" refers to those systems in which various elements of hardware and software may be shared by one or more tenants. For example, the multi-tenant server 104 may simultaneously process requests for a great number of tenants, and a given database table may store records for a potentially much greater number of tenants. The multi-tenant server 104 may include an application platform including a framework (e.g., services and metadata) that allows applications to execute, such as the hardware or software infrastructure of the system. In one implementation, the multi-tenant server 104 includes separate virtual spaces/organizations (sometimes referred to as portions or partitions) for data/objects as well as services of each tenant system 102A. For example, each tenant system 102A may be assigned a separate virtual space/organization. Each virtual space/organization is a logical partition within the multi-tenant server 104 and includes separate tenant level objects 104B that are only accessible to that tenant system 102A and are inaccessible to other tenant systems 102A (e.g., tenant systems 102A cannot read and/or write tenant level objects 104B of another tenant system 102A) in addition to services used by the multi-tenant server 104 on behalf of the corresponding tenant system 102A (e.g., blockchain services 104D).

As shown in FIG. 1, the peer-to-peer blockchain network 108 may include the tenant systems 102A, which each represent tenants/peers, along with the non-tenant systems 102B. The peer-to-peer blockchain network 108 shown in FIG. 1 is a representation of peers within the blockchain network 108. In some embodiments, the peer-to-peer blockchain network 108 may be viewed as a distributed network that is controlled by the multi-tenant server 104 with inputs/requests from the systems 102.

Figure 2B:
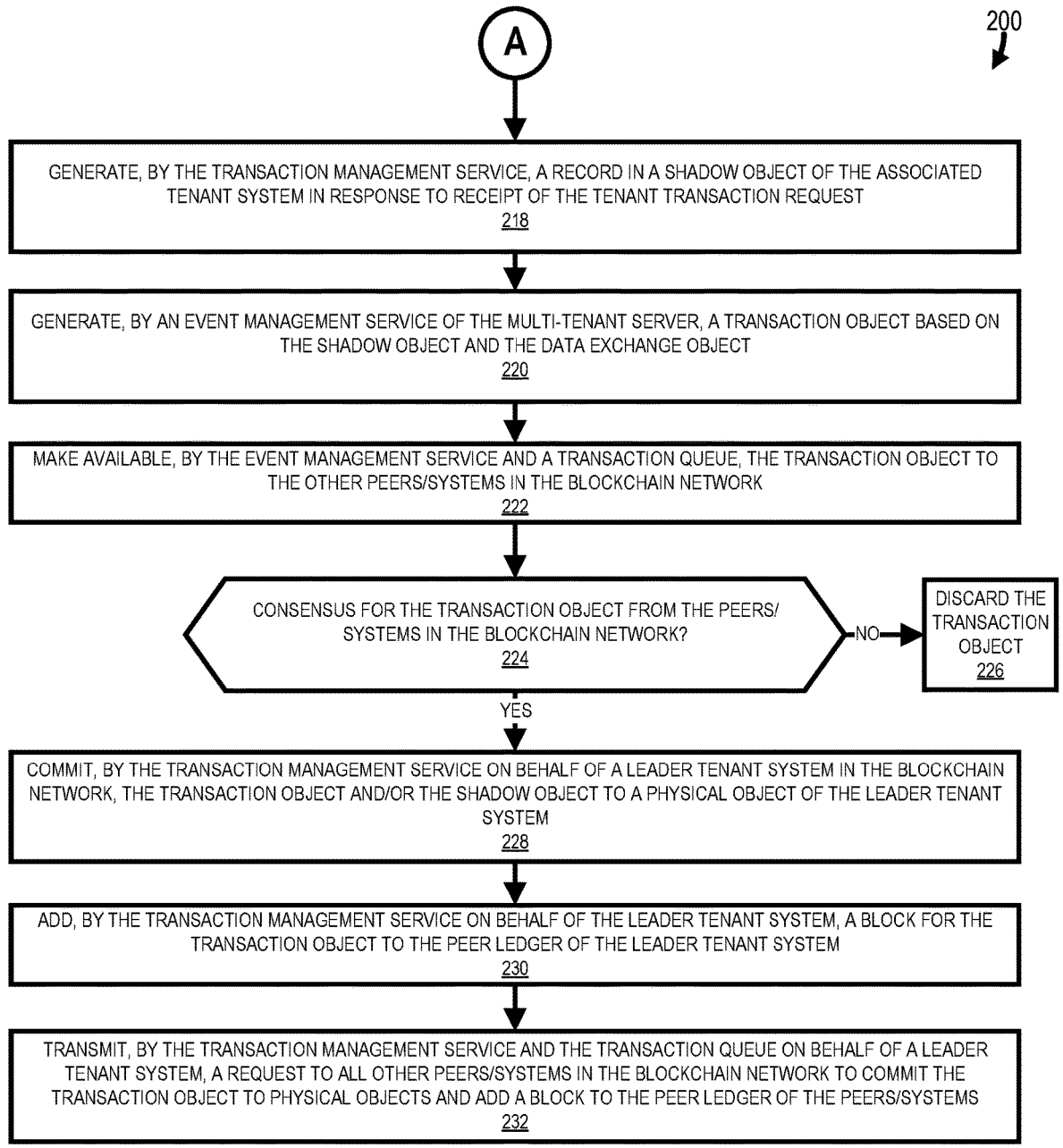

Turning now to FIGS. 2A and 2B, a method 200 according to some implementations will be described for the multi-tenant server 104 to manage data in the peer-to-peer blockchain network 108. In particular, the multi-tenant cloud environment provided by the multi-tenant server 104 may be used for managing blockchain transactions between the tenant systems 102A and the non-tenant systems 102B. Accordingly, the method 200 allows a cloud environment to provide the same level of security, trust, and immutability of information as a blockchain network during inter-tenant and tenant-to-non-tenant communications while centralizing functionality/operations of the peer-to-peer blockchain network 108 for both tenant systems 102A and non-tenant systems 102B. In some implementations, as will be described in greater detail below, the non-tenant systems 102B may be provided with a reduced set of privileges or possible operations in the peer-to-peer blockchain network 108 since the non-tenant systems 102B are not tenants in a multi-tenant environment/system managed by the multi-tenant server 104.

The method 200 will be described in relation to the example computing environment 100 shown in FIG. 1, the example computing environment 300A shown in FIG. 3A, and/or the example computing environment 300B shown in FIG. 3B. However, in other implementations, the method 200 may operate in other environments, including different implementations of the multi-tenant server 104.

As noted above, the operations in the flow diagram of FIGS. 2A and 2B will be described with reference to the exemplary implementations of the other figures. However, it should be understood that the operations of the flow diagram can be performed by implementations other than those discussed with reference to the other figures, and the implementations discussed with reference to these other figures can perform operations different than those discussed with reference to the flow diagrams.

Although described and shown in FIGS. 2A and 2B in a particular order, the operations of the method 200 are not restricted to this order. For example, one or more of the operations of the method 200 may be performed in a different order or in partially or fully overlapping time periods. Accordingly, the description and depiction of the method 200 is for illustrative purposes and is not intended to restrict to a particular implementation.

As shown in FIGS. 2A and 2B, the method 200 may commence at operation 202 with the membership service 302A of the blockchain services 104D determining and/or adding a set of peers to the peer-to-peer blockchain network 108. In some implementations, the peer-to-peer blockchain network 108 is identified in the network object 304A and the peers for the peer-to-peer blockchain network 108 are identified in the peers object 304B. For example, the membership service 302A may determine a set of peers in the peer-to-peer blockchain network 108 by examining the peers object 304B at operation 202. In some implementations, adding a peer to the peer-to-peer blockchain network 108 may require consensus through a process of verification/validation from the current peers in the peer-to-peer blockchain network 108. In the example computing environment 100 of FIG. 1, the example computing environment 300A of FIG. 3A, and the example computing environment 300B of FIG. 3B, the membership service 302A determines at operation 202 that the peer-to-peer blockchain network 108 includes the systems $102A_1$, $102A_2$, $102B_1$, and $102B_2$, which each respectively represent peers in the peer-to-peer blockchain network 108.

As noted above, each of the tenant systems 102A may include a separate virtual space/organization within the multi-tenant server 104. Each virtual space/organization includes separate tenant level objects 104B that are only accessible to that tenant system 102A and is inaccessible to other systems 102 (e.g., systems 102 cannot read and/or write tenant level objects 104B of another system 102), in addition to services used by the multi-tenant server 104 on behalf of the corresponding tenant systems 102A (e.g., blockchain services 104D). For example, as shown in FIG. 3A, each tenant system 102A may be associated with a separate virtual space/organization $314_1$ and $314_2$ with corresponding tenant level objects $104B_1$ and $104B_2$ (e.g., physical objects $306_1$ and $306_2$, shadow objects $308_1$ and $308_2$, peer ledgers $310_1$ and $310_2$, and mapping objects $316_1$ and $316_2$) and blockchain services $104D_1$ and $104D_2$.

Figure 3A:
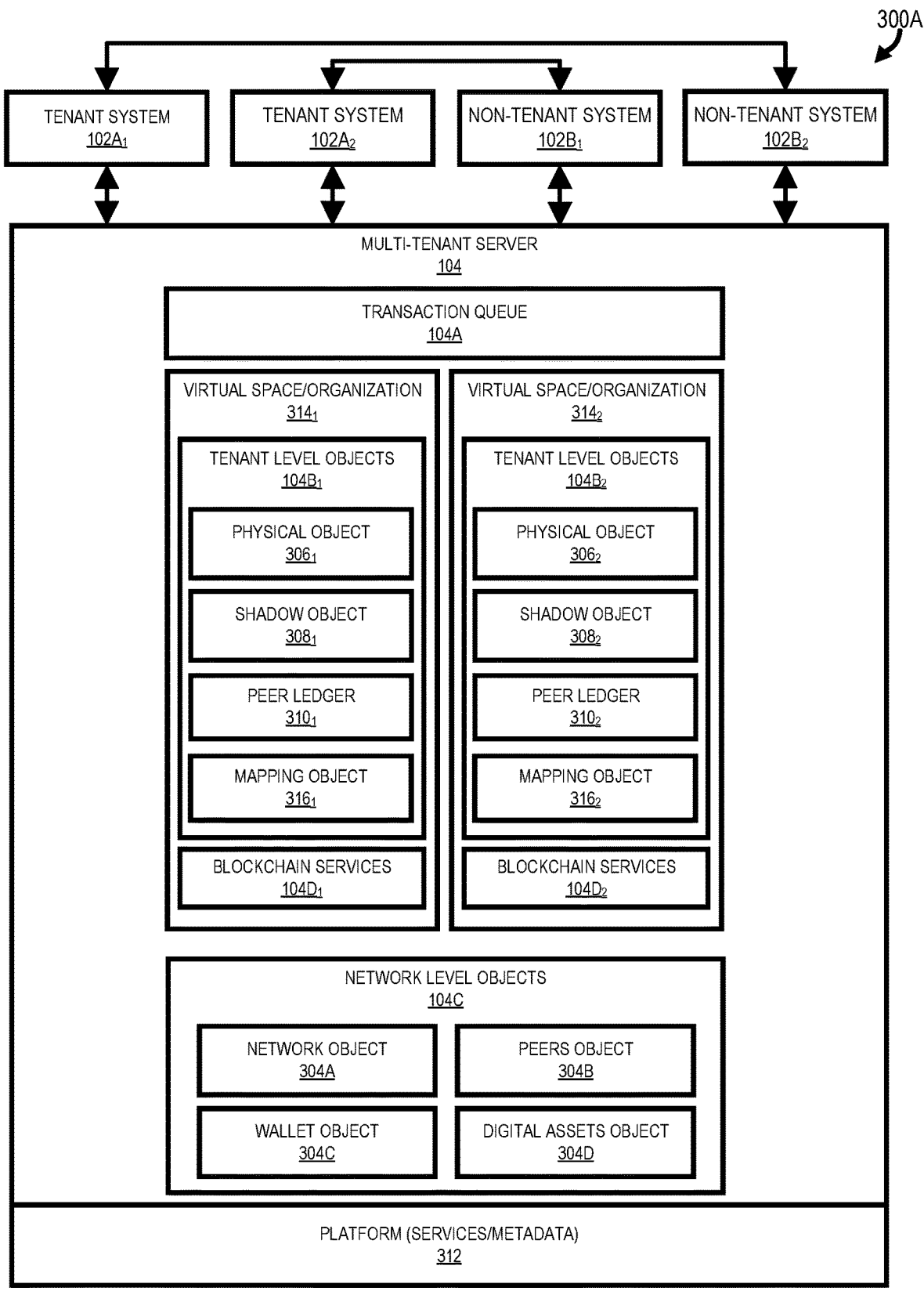
FIG. 3A shows the computing environment, including a set of separate blockchain services per tenant system, according to one example implementation.
Figure 3B:
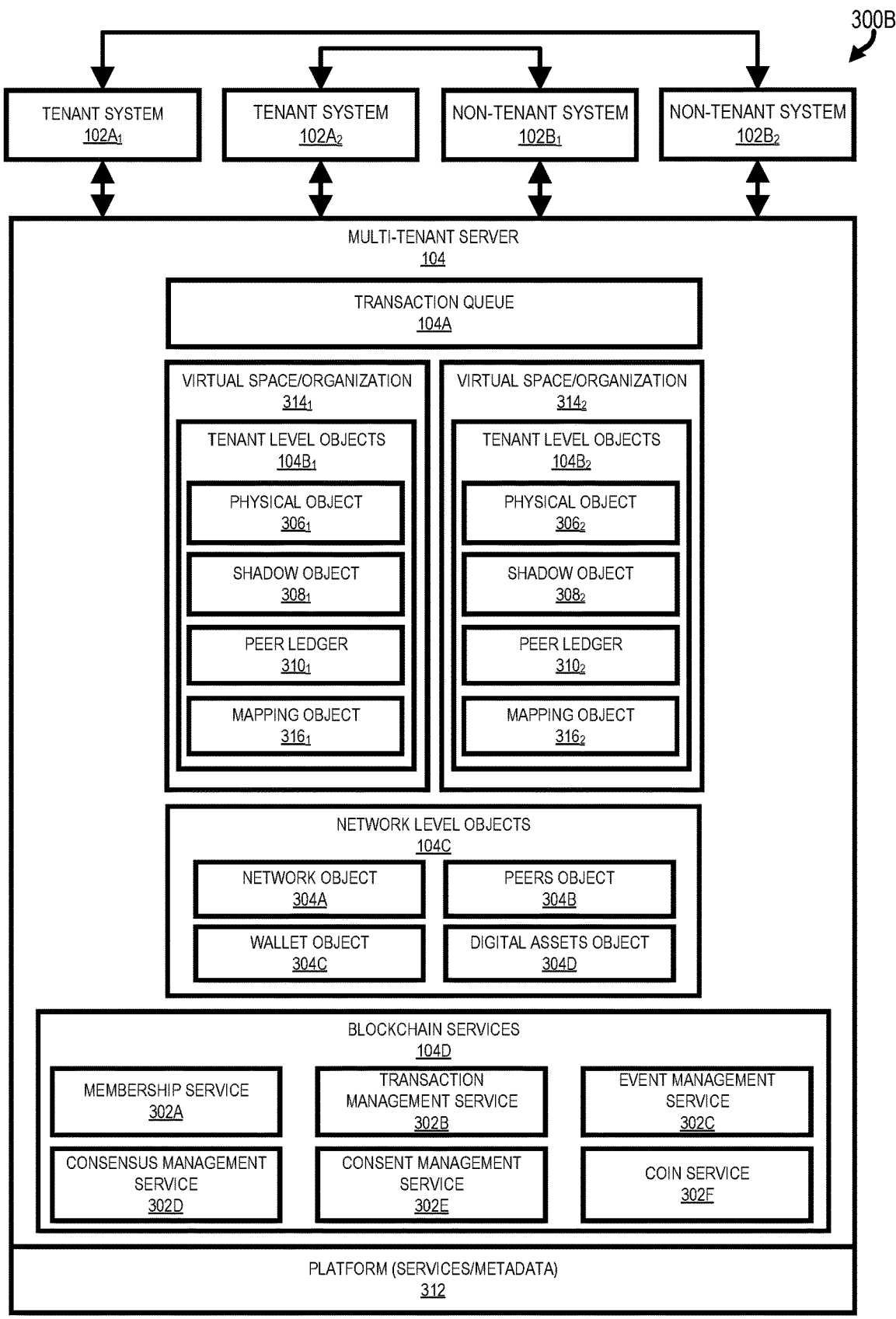
FIG. 3B shows the computing environment, including a set of shared blockchain services, according to another example implementation.

Although shown in FIG. 3A as separate instantiations of the blockchain services $104D_1$ and $104D_2$ for each virtual space/organization $314_1$ and $314_2$, each virtual space/organization $314_1$ and $314_2$ may instead have separate access to a single instantiation of the blockchain services 104D as shown in FIG. 3B.

At operation 204, the membership service 302A may generate a set of public keys (PKs) and private/secret keys (SKs) for each peer in the peer-to-peer blockchain network 108. In one implementation, the public keys are generated based on a determined private key. For example, a one-way cryptographic hash function (e.g., SHA256) may be used to generate public keys for the systems 102 based on corresponding private keys. In some implementations, public keys and the private/secret keys are only generated for tenant systems 102A as these are the only systems 102 that may directly initiate transactions in the peer-to-peer blockchain network 108. In one implementation, the public keys and the private/secret keys may be stored by the membership service 302A in the wallet object 304C following generation at operation 204. As will be described in greater detail below, the transaction queue 104A may utilize the private/secret keys stored in the wallet object 304C for generating transaction objects for corresponding tenant systems 102A. In particular, the private/secret keys may be used by the transaction queue 104A for implementing cryptographic elements of transactions used by the peer-to-peer blockchain network 108.

Figure 4:
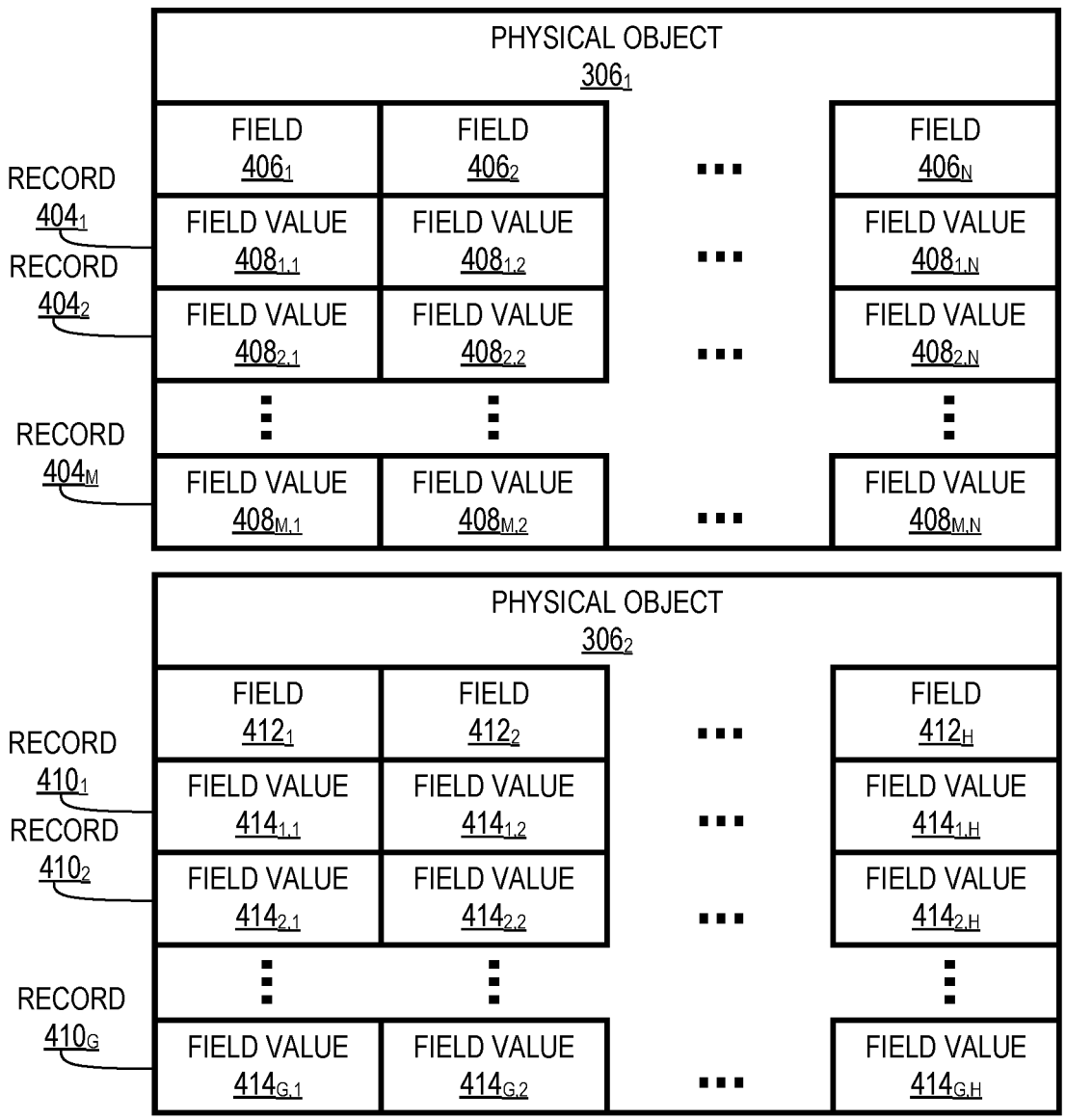
FIG. 4 shows physical objects corresponding to a set of tenant systems, according to one example implementation.

At operation 206, the membership service 302A may determine an exchange object for the peer-to-peer blockchain network 108. In one implementation, the exchange object is defined by a set of exchange fields and mapping metadata that defines mappings between each exchange field and fields in physical objects of the tenant systems 102A. For example, FIG. 4 shows physical objects $306_1$ and $306_2$ for the tenant systems $102A_1$ and $102A_2$, respectively. In this example, the physical object $306_1$, corresponding to the tenant system $102A_1$, includes records $404_1$-$404_M$, which are composed of fields $406_1$-$406_N$, and each record $404_1$-$404_M$ includes values $408_{1,1\text{-}M,N}$ for each field $406_1$-$406_N$. Similarly, the physical object $306_2$, corresponding to the tenant system $102A_2$, includes records $410_1$-$410_G$, which are composed of fields $412_1$-$412_H$, and each record $410_1$-$410_G$ includes values $414_{1,1\text{-}G,H}$ for each field $412_1$-$412_H$. Each of the physical objects $306_1$ and $306_2$ may represent any type of data. For example, the tenant system $102A_1$ may operate in or otherwise correspond to a medical laboratory. In this example, the physical object $306_1$ may represent medical lab reports (e.g., each of the records $404_1$-$404_M$ may correspond to separate medical lab reports). The tenant system $102A_2$ may operate in or otherwise correspond to a doctor's office. In this example, the physical object $306_2$ may represent a patient file (e.g., each of the records $410_1$-$410_G$ may correspond to separate patient files).

Figure 5:
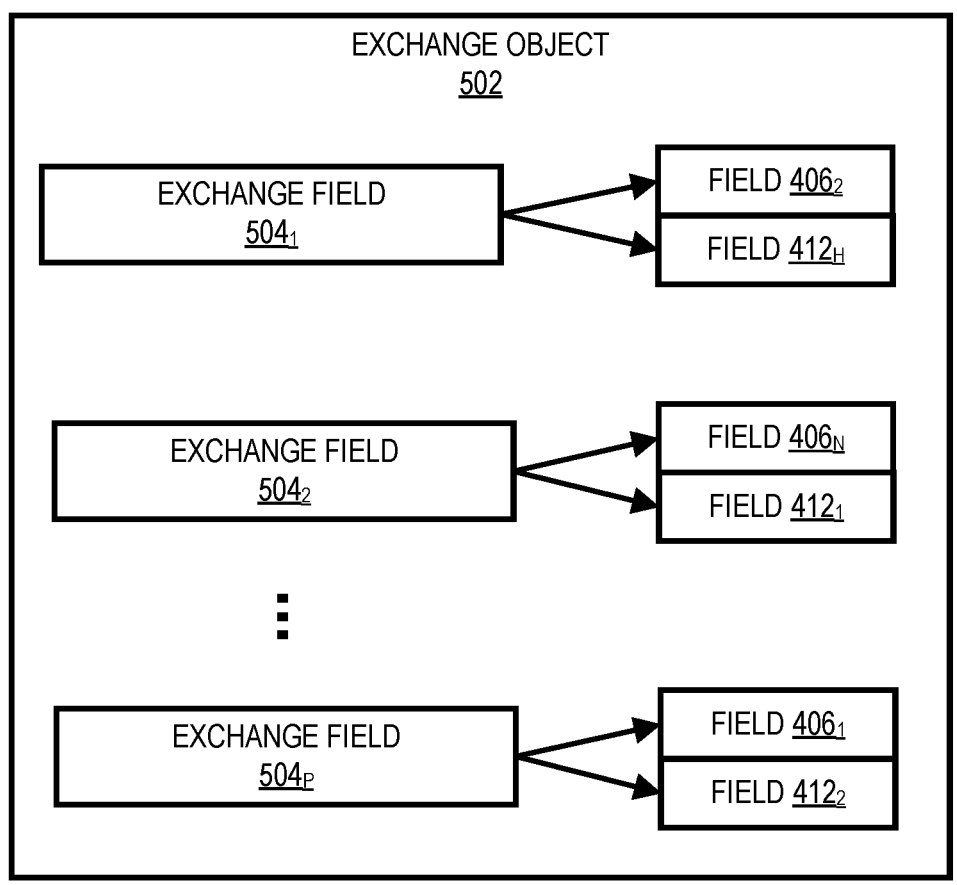
FIG. 5 shows an exchange object, including a set of mappings between exchange fields and fields of physical objects, according to one example implementation.

For the example physical objects $306_1$ and $306_2$ shown in FIG. 4, the membership service 302A may determine an exchange object 502 as shown in FIG. 5, which may be stored in the digital assets object 304D. As shown in FIG. 5, the exchange object 502 is defined by the exchange fields $504_1$-$504_P$ and the mapping metadata that maps exchange fields 504 to fields of physical objects 306. In this configuration, the exchange field $504_1$ maps to the field $406_2$ of the physical object $306_1$ and the field $412_H$ of the physical object $306_2$. The exchange field $504_2$ maps to the field $406_N$ of the physical object $306_1$ and the field $412_1$ of the physical object $306_2$. The exchange field $504_P$ maps to the field $406_1$ of the physical object $306_1$ and the field $412_2$ of the physical object $306_2$. Accordingly, the mapping metadata of the exchange object 502 maps/links exchange fields 504 to fields of physical objects 306. In some implementations, the number of exchange fields $504_1$-$504_P$ (i.e., P) is less than (1) the number of fields $406_1$-$406_N$ in the physical object $306_1$ (i.e., N) and/or (2) the number of fields $412_1$-$412_H$ in the physical object $306_2$ (i.e., H). Accordingly, a generated transaction object, which will be distributed amongst the tenant systems 102A and/or the non-tenant systems 102B, and corresponding data/information included in distributed peer ledgers 310 may not include sensitive data (i.e., data in fields 406 and 412 not mapped to exchange fields 504).

The mapping of exchange fields 504 to fields 406 and 412 of physical objects $306_1$ and $306_2$ indicates a relationship between the fields 406 and 412 of physical objects $306_1$ and $306_2$. For instance, using the example above in which the physical object $306_1$ represents medical lab reports and the physical object $306_2$ represents patient files, the field $406_2$ of the physical object $306_1$ may correspond to a patient identifier for which a corresponding medical lab report was generated and the field $412_H$ of the physical object $306_2$ may correspond to a patient identifier for which a corresponding patient file represents. As shown in FIG. 5 and described above, these fields $406_2$ and $412_H$ are mapped to the same exchange field $504_1$, indicating that these fields $406_2$ and $412_H$ represent similar data (e.g., the fields $406_2$ and $412_H$ both represent patient identifiers).

In some implementations, each peer and/or corresponding tenant system 102A may be part of multiple blockchain networks, including the blockchain network 108. Each of these blockchain networks may include overlapping membership with the blockchain network 108 and/or may include additional peers. In some implementations, the network object 304A may include identifiers for each blockchain network managed by the multi-tenant server 104, the peers object 304B may include identifiers for each peer in the blockchain networks managed by the multi-tenant server 104, the wallet object 304C may include keys for each peer and/or tenant system 102 in the blockchain networks managed by the multi-tenant server 104, and the digital assets object 304D may include exchange objects 502 for each blockchain network managed by the multi-tenant server 104.

At operation 208, each non-tenant system 102B may establish an association/relationship with a tenant system 102A. For example, as shown in FIG. 3A and FIG. 3B, the non-tenant system $102B_1$ may establish an association/relationship with the tenant system $102A_2$ and the non-tenant system $102B_2$ may establish an association/relationship with the tenant system $102A_1$. As will be described in greater detail below, this association/relationship between non-tenant systems 102B and tenant systems 102A allow the non-tenant systems 102B to indirectly initiate transaction in the peer-to-peer blockchain network 108, which is managed by the multi-tenant server 104. In particular, despite the non-tenant systems 102B not being tenants of a multi-tenant system/environment managed by the multi-tenant server 104, the non-tenant systems 102B may indirectly initiate transaction in the peer-to-peer blockchain network 108, which is managed by the multi-tenant server 104, via corresponding tenant system 102A.

At operation 210, a non-tenant request generator 114 of a non-tenant system 102B may generate and transmit a non-tenant transaction request to an associated tenant system 102A. For instance, in the example computing environments 300A and/or 300B, the non-tenant system $102B_2$ is associated with the tenant system $102A_1$. In this example, which will be used for purposes of explaining the method 200, the non-tenant request generator $114_2$ of the non-tenant system $102B_2$ may generate a non-tenant transaction request and transmit this non-tenant transaction request to the tenant system $102A_1$ at operation 210. The non-tenant transaction request may be used by the non-tenant system $102B_2$ to initiate a transaction in the peer-to-peer blockchain network 108. The transaction of the non-tenant system $102B_2$ may attempt to modify a physical object of the non-tenant system $102B_2$ upon consensus for the transaction in the peer-to-peer blockchain network 108.

At operation 212, the associated tenant system $102A_1$ receives the non-tenant transaction request. In particular, the request receiver $112_1$ of the tenant system $102A_1$ receives the non-tenant transaction request at operation 212.

At operation 214, a transaction generator $110_1$ of the tenant system $102A_1$ may generate and transmit a transaction request (sometimes referred to as a "tenant transaction request") to the multi-tenant server 104 for initiating a transaction in the peer-to-peer blockchain network 108.

At operation 216, the transaction management service 302B of the blockchain services 104D may receive the transaction request from the tenant system $102A_1$. The transaction request includes (1) a proposed new record to add to a physical object 306 or (2) a modification to an existing record of a physical object 306. For instance, as described in the above example, the physical object $306_1$ may correspond to medical lab reports and the transaction management service 302B of the virtual space/organization $314_1$ associated with the tenant system $102A_1$ may receive a transaction request to add a new lab report record 404 at operation 216. In another example, again the physical object $306_1$ may correspond to medical lab reports and the transaction management service 302B of the virtual space/organization $314_1$ may receive a request to modify an existing lab report record 404 at operation 216. The proposed alteration to a physical object 306 is instigated and described in a non-tenant transaction request. For purposes of explanation, the method 200 will be described in relation to the transaction management service 302B of the virtual space/organization $314_1$ receiving a transaction request to add a record to the physical object $306_1$ at operation 216. However, the method 200 may work in a similar fashion for modification of a physical object 306.

At operation 218, the transaction management service 302B of the virtual space/organization $314_1$ of the tenant system $102A_1$ generates a record in a shadow object $308_1$ corresponding to the new record of operation 216. The shadow object $308_1$ may correspond to the tenant system $102A_1$ and may include all the fields $406_1$-$406_N$ of the physical object $306_1$. In contrast to the physical object $306_1$, which stores committed data that is also represented in a corresponding peer ledger $310_1$ of the tenant system $102A_1$ (e.g., additions/modifications to records 404 of the physical object $306_1$ of the tenant system $102A_1$), the shadow object $308_1$ represents un-committed data to the physical object $306_1$. As will be described in greater detail below, the data in the shadow object $308_1$ of the tenant system $102A_1$ needs to be validated/verified through consensus by the other tenant system $102A_2$ and the non-tenant systems 102B before being committed to the physical object $306_1$ and represented by the peer ledger $310_1$ of the tenant system $102A_1$. This committal and representation may also extend to the physical object $306_2$, the physical object of the non-tenant system $102B_2$, peer ledger $310_2$, and a peer ledger of the non-tenant system $102B_2$ as will be described in greater detail below.

Figure 6:
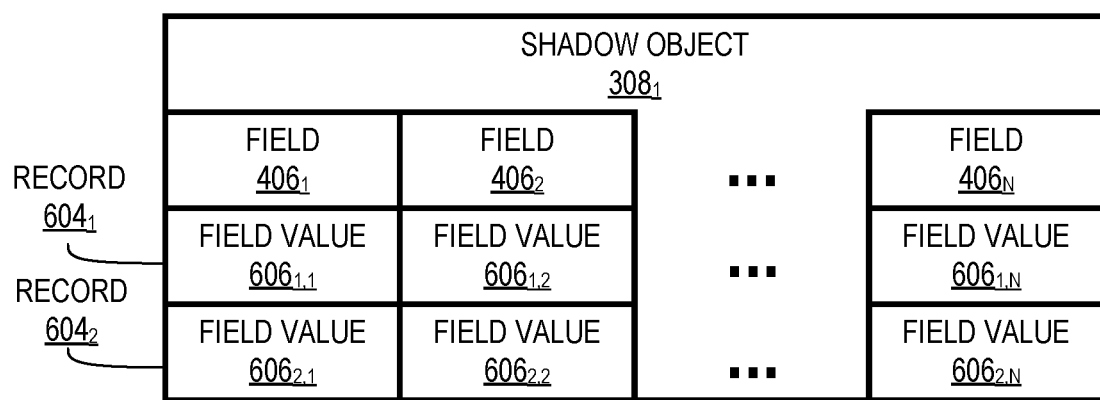
FIG. 6 shows an example of a shadow object corresponding to a tenant system, according to one example implementation.

FIG. 6 shows an example of a shadow object $308_1$ corresponding to the tenant system $102A_1$ and the physical object $306_1$, according to one example implementation. As shown, the shadow object $308_1$ includes two records $604_1$ and $604_2$, corresponding to two separate proposed alterations to the physical object $306_1$. For example, the first record $604_1$ corresponds to the addition/insertion of a record 404 in the physical object $306_1$ and the second record $604_2$ corresponds to the modification/update of a field value 408 for the newly added/inserted record 404 in the physical object $306_1$. For instance, the first record $604_1$ may propose the addition/insertion of a record 404 corresponding to a medical lab report, while the second record $604_2$ may propose the modification of several field values 408 of the new medical lab report record 404 (e.g., modification/update of a field value 408 corresponding to the status of the medical lab report).

At operation 220, the event management service 302C and/or the transaction queue 104A may generate a transaction object based on (1) the record $604_1$ added to the shadow object $308_1$ at operation 218 and (2) the exchange object 502 of the peer-to-peer blockchain network 108. In particular, the transaction object may include values for each of the exchange fields $504_1$-$504_P$ and the transaction object includes data/field values from the record $604_1$ added to the shadow object $308_1$ at operation 218 in corresponding exchange fields $504_1$-$504_P$. For example, FIG. 7 shows an example of a transaction object 702, according to one example implementation.

Figure 7:
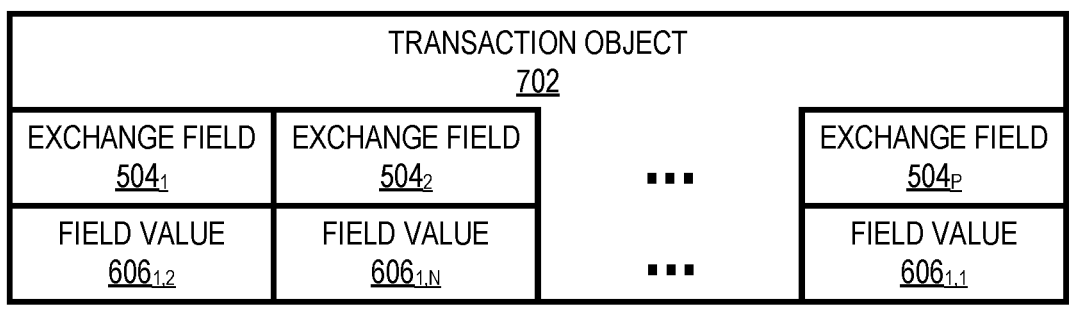
FIG. 7 shows an example of a transaction object, according to one example implementation.

As shown in FIG. 7, the transaction object 702 includes all the exchange fields $504_1$-$504_P$ of the exchange object 502 and field values 606 from the record $604_1$ in the shadow object $308_1$ in the appropriate positions based on the mapping between exchange fields $504_1$-$504_P$ and fields 406 of the physical object $306_1$. Although shown in relation to the record $604_1$, a separate transaction object 702 may be generated for the record $604_2$. As will be described below, the transaction object 702, which will be used hereinafter for purposes of illustration, may be passed or otherwise made available to the other tenant system $102A_2$ and the non-tenant systems 102B to determine if there is consensus in the blockchain network 108 to commit the proposed record 404 (e.g., to verify/validate the transaction object 702).

In one implementation, generation of the transaction object 702 may include adding a signature to the transaction object based on (1) the record $604_1$ from the shadow object $308_1$, (2) a unique assigned identifier of the transaction object 702 (e.g., an identifier assigned sequentially to transaction objects 702 as they are generated), and (3) the private key of the tenant system $102A_1$ (i.e., the private key of the tenant system 102A proposing the alteration). For example, the record $604_1$ and the unique assigned identifier of the transaction object 702 may be merged or otherwise combined together to form a single message and the private key of the tenant system $102A_1$ may be used to encrypt the message (e.g., using a one-way cryptographic hash function, such as SHA256) to form a digital signature. Accordingly, the transaction object 702 includes the record $604_1$ from the shadow object $308_1$ along with the signature generated using the private key of the tenant system $102A_1$.

At operation 222, the event management service 302C and the transaction queue 104A may make the transaction object 702 available to the other tenant system $102A_2$ and the non-tenant systems 102B. In some implementations, making the transaction object 702 available to the other tenant system $102A_2$ includes the transaction queue 104A placing the transaction object 702 in a portion/partition of the multi-tenant server 104 accessible to the tenant systems $102A_2$. For example, as described above, the multi-tenant server 104 may include a separate virtual space/organization 314 for each of the tenant systems 102A. Each virtual space/organization 314 includes data and services that are only accessible to that tenant system 102A and is inaccessible to other tenant systems 102A. At operation 222, the multi-tenant server 104 may pass the transaction object 702 from the virtual space/organization $314_1$ of the tenant system $102A_1$ to the virtual space/organization $314A_2$ of the tenant system $102A_2$ such that the virtual space/organization $314_2$ of the tenant system $102A_2$ can process/analyze the transaction object 702 for possible validation/verification.

As noted above, the event management service 302C and the transaction queue 104A may also make the transaction object 702 available to the non-tenant systems 102B at operation 222 in addition to the other tenant system $102A_2$. For example, the multi-tenant server 104 may transmit the transaction object 702 to the non-tenant systems 102B such that the transaction object 702 may be received by the consensus unit 116 of the non-tenant systems 102B.

At operation 224, the transaction management service 302B may monitor responses from the tenant system $102A_2$ and the non-tenant systems 102B to determine if consensus has been reached regarding the transaction object 702 or if consensus has failed to be reached. In one implementation, the consensus management service 302D may define the threshold or rules for use by the transaction management service 302B in determining when consensus has been reached by the tenant system $102A_2$ and the non-tenant systems 102B regarding the transaction object 702. For example, in some implementations, the consensus management service 302D may indicate that consensus requires all of the systems $102A_2$, $102B_1$, and $102B_2$ to verify/validate the transaction object 702, while in other implementations, the consensus management service 302D may indicate that consensus requires a majority of the systems $102A_2$, $102B_1$, and $102B_2$ to verify/validate the transaction object 702. In some implementations, the consent management service 302E indicates the rules and/or operations used by the systems $102A_2$, $102B_1$, and $102B_2$, and in particular the virtual space/organization $314_2$ associated with the tenant system $102A_2$ and the consensus units $116_1$ and $116_2$ associated with the non-tenant systems $102B_1$ and $102B_2$, to determine if verification/validation of the transaction object 702 is proper. For example, the consent management service 302E may indicate that the public key of the tenant system $102A_1$ is used along with the signature and message in the transaction object 702 for determining whether the transaction object 702 originated from and was authorized by the tenant system $102A_1$.

At operation 226, the transaction management service 302B and the transaction queue 104A may discard the transaction object 702 in response to failing to obtain consensus from the systems $102A_2$, $102B_1$, and $102B_2$ (e.g., failing to obtain consensus as defined/indicated by the consensus management service 302D). In some implementations, discarding the transaction object 702 may include indicating to the tenant system $102A_1$ that the transaction object 702 and corresponding alteration to the physical object $306_1$ (i.e., addition of a new record 404 to the physical object $306_1$ or modification of an existing record 404 to the physical object $306_1$) has been rejected by the peer-to-peer blockchain network 108 (i.e., consensus in the peer-to-peer blockchain network 108 was not achieved/obtained). This notification may thereafter be forwarded to the non-tenant system $102B_1$, which indirectly initiated the transaction object 702 at operation 210 via the non-tenant system transaction request. In response to receipt of notification that the transaction object 702 and corresponding alteration to the physical object has been rejected by the peer-to-peer blockchain network 108, the virtual space/organization $314_1$ may delete the record $604_1$ in the shadow object $308_1$ corresponding to the transaction object 702.

At operation 228, the transaction management service 302B may commit the transaction object 702 and/or the record $604_1$ in the shadow object $308_1$ corresponding to the transaction object 702 for which consensus was achieved on behalf of a leader tenant system 102A. In some implementations, a leader tenant system 102A may be randomly selected from amongst the tenant systems 102A in the peer-to-peer blockchain network 108 by the membership service 302A. When the leader tenant system 102A is the tenant system $102A_1$ (i.e., the tenant system 102A that instigated or was otherwise associated with the alteration to the physical object $306_1$), the transaction management service 302B in the virtual space/organization $314_1$ of the tenant system $102A_1$ may commit the record $604_1$ in the shadow object $308_1$, which corresponds to the transaction object 702 for which consensus was achieved, on behalf of the tenant system $102A_1$ at operation 228. In this situation, committal may include adding the record $604_1$ from the shadow object $308_1$ to the physical object $306_1$. When the leader tenant system 102A is the tenant system $102A_2$, the transaction management service 302B in the corresponding virtual space/organization $314_2$ of the tenant system $102A_2$ may commit the transaction object 702 that consensus was achieved on behalf of the tenant system $102A_2$ at operation 228. In this situation, committal may include adding a record 410 to or modifying a record 410 in the physical object $306_2$ that includes the field values 606 from the shadow object $308_1$ mapped to corresponding fields 412 in the physical object $306_2$ as indicated by the exchange object 502 or corresponding mapping object 316.

Figure 8:
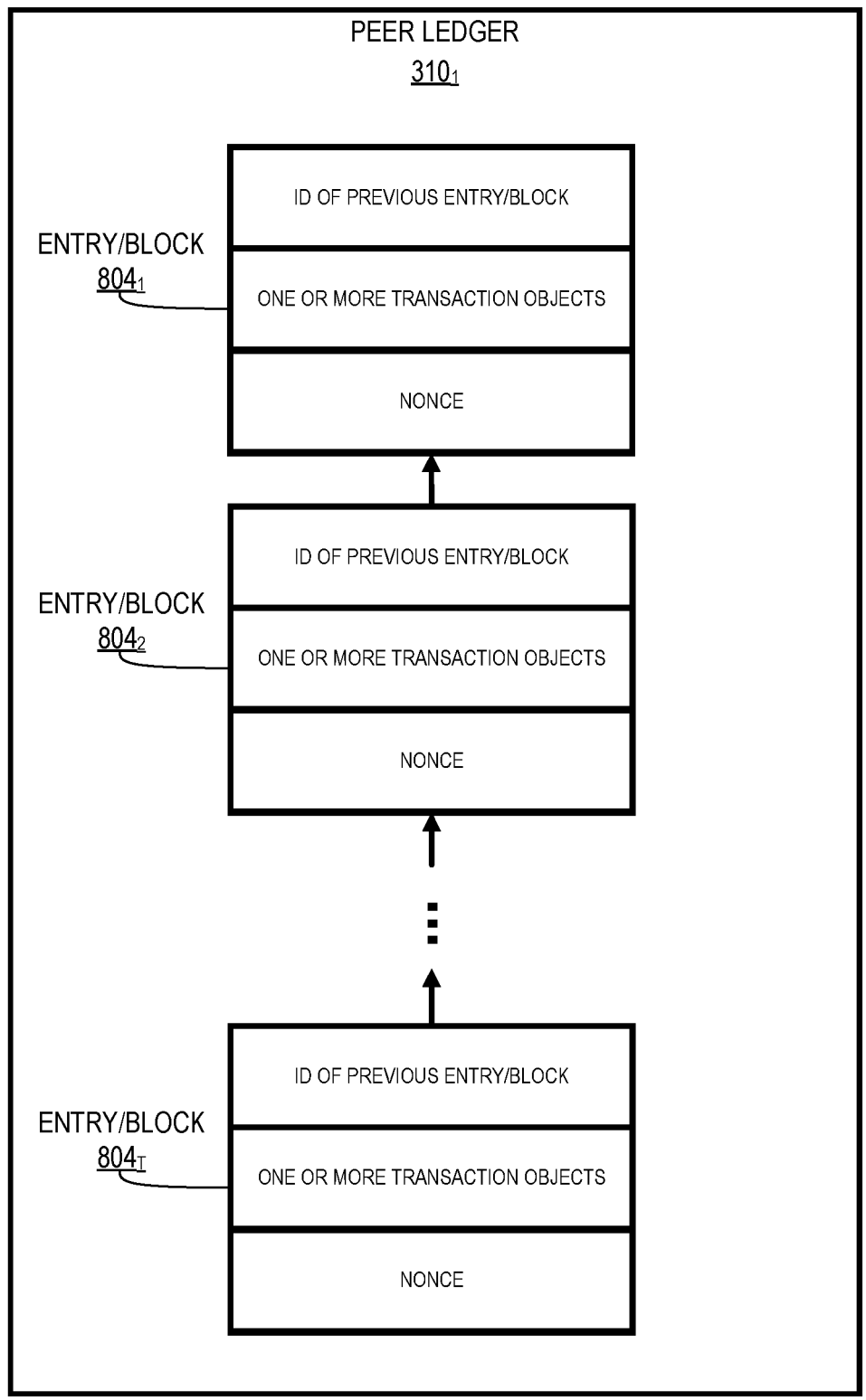
FIG. 8 shows an example of a blockchain, including a set of entries/blocks, according to one example implementation.

At operation 230, the transaction management service 302B may add an entry/block in the peer ledger 310 corresponding to the transaction object 702 on behalf the leader tenant system 102A. In particular, the transaction management service 302B of the virtual space/organization 314 of the leader tenant system 102A may add an entry/block in the peer ledger 310 corresponding to the transaction object 702 on behalf the leader tenant system 102A. The entry/block added to the peer ledger 310 may include several pieces of information. For example, as shown in FIG. 8, each entry/block $804_1$-$804_T$ in the peer ledger $310_1$ may include a reference to the previous entry/block 804 in the peer ledger $802_1$, the transaction object 702 (along with one or more other transaction objects), and a nonce (i.e., an arbitrary number used to meet a requirement of the peer-to-peer blockchain network 108).

At operation 232, the transaction management service 302B and/or the transaction queue 104A may transmit a request or otherwise trigger the other systems 102 on behalf of the leader tenant system 102A to commit the transaction object 702 to a corresponding physical object and add a block/entry to a corresponding peer ledger (e.g., the physical object 306 and peer ledger 310). For example, as shown in FIG. 9, each non-tenant system 102B may include a physical object 306 (e.g., physical objects $306_3$ and $306_4$) and a peer ledger 310 (e.g., peer ledgers $310_3$ and $310_4$) that are maintained by the corresponding non-tenant system 102B. In some implementation, the peer ledgers 310 of non-tenant systems 102B only maintain or otherwise include blocks corresponding to transactions pertinent to the non-tenant systems 102B. Accordingly, the peer ledgers 310 of the non-tenant systems 102B (e.g., peer ledgers $310_3$ and $310_4$) may include a subset of information/blocks from the peer ledgers 310 of the tenant systems 102B (e.g., peer ledgers $310_1$ and $310_3$). The peer ledgers 310 allow the computing environments 100, 300A, and/or 300B to maintain transparency and auditability of data. In particular, the multi-tenant server 104 provides immutability to each transaction by recording/reflecting the transaction in peer ledgers 310, which are replicated across all the systems 102. In some implementations, the peer ledgers 310 may be stored in a Merkle directed acyclic graph (DAG) structure. The Merkle DAG may be represented in an Oracle and/or HBase store. In conjunction with, after, or upon data being committed to the peer ledgers 310, relevant physical objects 306 will be updated with the most recent data in the peer ledgers 310.

As illustrated above, the method 200 allows the multi-tenant server 104 to manage data in the peer-to-peer blockchain network 108 on behalf of the tenant systems 102A and non-tenant systems 102B. In particular, the cloud environment provided by the multi-tenant server 104 may be used for managing blockchain transactions between the systems 102 that are managed by the multi-tenant server 104 and those that are not managed by the multi-tenant server 104. Accordingly, the method 200 allows a cloud environment to provide the same level of security, trust, and immutability of information as a blockchain network during inter-tenant and intra-tenant communications while centralizing functionality/operations of the peer-to-peer blockchain network 108.

In some implementations, the computing environments 300A and/or 300B may be built on top of a platform 312 comprised of services and/or metadata for implementing the other components of the multi-tenant server 104. In some implementations, the blockchain services 104D may include additional services, such as a coin service 302F for tracking records and items associated with each tenant/peer.

As used above, the term "user" is a generic term referring to an entity (e.g., an individual person) using a system and/or service. A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or a tenant system) to communicate with the service. The server and client electronic devices may be operated by users respectively in the roles of administrator (also known as an administrative user) and end user.

Figure 10A:
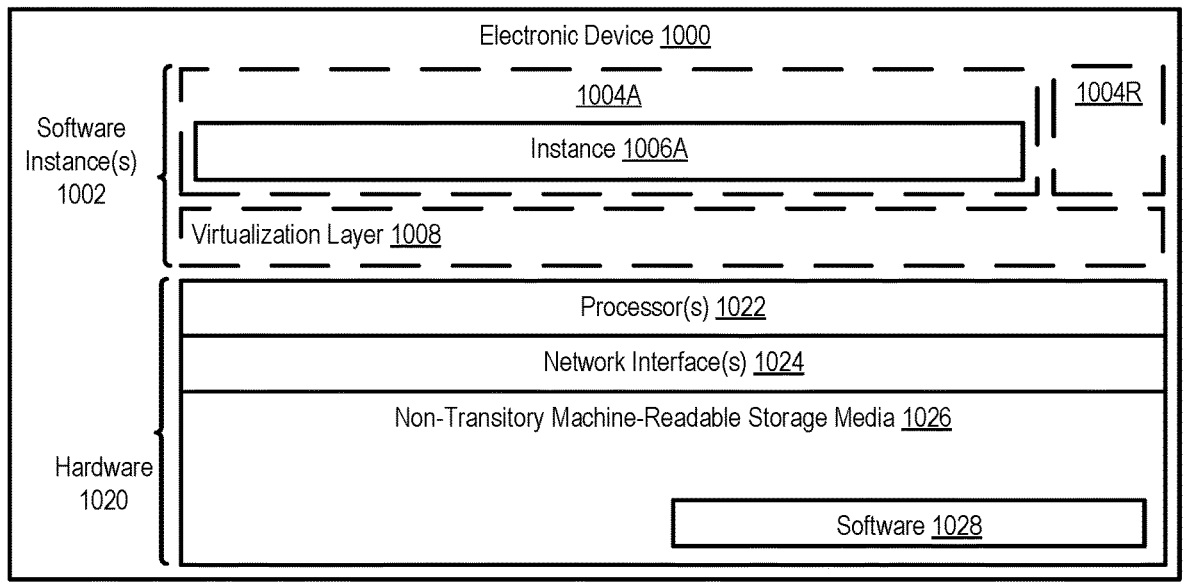
FIG. 10A shows an electronic device according to one example implementation.

FIG. 10A is a block diagram illustrating an electronic device 1000 according to some example implementations.

FIG. 10A includes hardware 1020 comprising a set of one or more processor(s) 1022, a set of one or more network interfaces 1024 (wireless and/or wired), and non-transitory machine-readable storage media 1026 having stored therein software 1028 (which includes instructions executable by the set of one or more processor(s) 1022). Each of the previously described systems 102 and the transaction queue 104A, the tenant level objects 104B, the network level objects 104C, and the blockchain services 104D may be implemented in one or more electronic devices 1000. In one implementation: 1) each of the systems 102 is implemented in a separate one of the electronic devices 1000 (e.g., in user electronic devices operated by users where the software 1028 represents the software to implement systems 102 to interface with the transaction queue 104A, the tenant level objects 104B, the network level objects 104C, and the blockchain services 104D (e.g., a web browser, a native client, a portal, a command-line interface, and/or an application program interface (API) based upon protocols such as Simple Object Access Protocol (SOAP), Representational State Transfer (REST), etc.)); 2) the transaction queue 104A, the tenant level objects 104B, the network level objects 104C, and the blockchain services 104D are implemented in a separate set of one or more of the electronic devices 1000 (e.g., a set of one or more server electronic devices where the software 1028 represents the software to implement the transaction queue 104A, the tenant level objects 104B, the network level objects 104C, and the blockchain services 104D); and 3) in operation, the electronic devices implementing the systems 102 and the transaction queue 104A, the tenant level objects 104B, the network level objects 104C, and the blockchain services 104D would be communicatively coupled (e.g., by a network) and would establish between them (or through one or more other layers) connections for submitting a proposed new record or a proposed modification to an existing record in a physical object to the multi-tenant server 104. Other configurations of electronic devices may be used in other implementations (e.g., an implementation in which the tenant systems 102 and the multi-tenant server 104 are implemented on a single electronic device 1000).

In electronic devices that use compute virtualization, the set of one or more processor(s) 1022 typically execute software to instantiate a virtualization layer 1008 and software container(s) 1004A-R (e.g., with operating system-level virtualization, the virtualization layer 1008 represents the kernel of an operating system (or a shim executing on a base operating system) that allows for the creation of multiple software containers 1004A-R (representing separate user space instances and also called virtualization engines, virtual private servers, or jails) that may each be used to execute a set of one or more applications; with full virtualization, the virtualization layer 1008 represents a hypervisor (sometimes referred to as a virtual machine monitor (VMM)) or a hypervisor executing on top of a host operating system, and the software containers 1004A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 1028 (illustrated as instance 1006A) is executed within the software container 1004A on the virtualization layer 1008. In electronic devices where compute virtualization is not used, the instance 1006A on top of a host operating system is executed on the "bare metal" electronic device 1000. The instantiation of the instance 1006A, as well as the virtualization layer 1008 and software containers 1004A-R if implemented, are collectively referred to as software instance(s) 1002.

Alternative implementations of an electronic device may have numerous variations from that described above. For example, customized hardware and/or accelerators might also be used in an electronic device.

A network device (ND) is an electronic device that communicatively interconnects other electronic devices on the network (e.g., other network devices, user electronic devices, server electronic devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 10B:
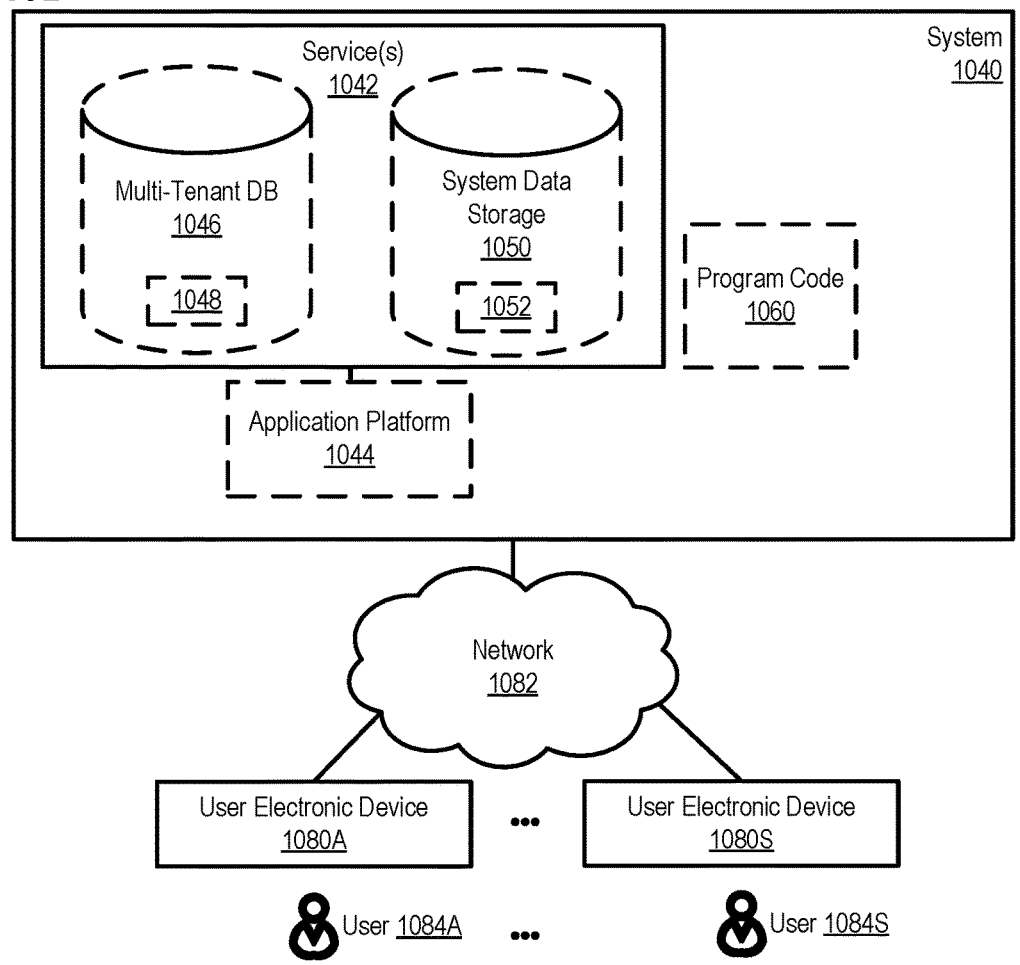
FIG. 10B shows a block diagram of an environment where the computing environment and the server may be implemented according to one example implementation.

FIG. 10B is a block diagram of an environment where the systems 102 and the multi-tenant server 104 may be deployed, according to some implementations. A system 1040 includes hardware (a set of one or more electronic devices) and software to provide service(s) 1042, including the transaction queue 104A, the tenant level objects 104B, the network level objects 104C, and the blockchain services 104D. The system 1040 is coupled to user electronic devices 1080A-S over a network 1082. The service(s) 1042 may be on-demand services that are made available to one or more of the users 1084A-S working for one or more other organizations (sometimes referred to as outside users) so that those organizations do not need to necessarily be concerned with building and/or maintaining a system, but instead makes use of the service(s) 1042 when needed (e.g., on the demand of the users 1084A-S). The service(s) 1042 may communication with each other and/or with one or more of the user electronic devices 1080A-S via one or more Application Programming Interface(s) (APIs) (e.g., a Representational State Transfer (REST) API). The user electronic devices 1080A-S are operated by users 1084A-S.

In one implementation, the system 1040 is a multi-tenant cloud computing architecture supporting multiple services, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 1040 may include an application platform 1044 that enables PAAS for creating, managing, and executing one or more applications developed by the provider of the application platform 1044, users accessing the system 1040 via one or more of user electronic devices 1080A-S, or third-party application developers accessing the system 1040 via one or more of user electronic devices 1080A-S.

In some implementations, one or more of the service(s) 1042 may utilize one or more multi-tenant databases 1046 for tenant data 1048, as well as system data storage 1050 for system data 1052 accessible to system 1040. In certain implementations, the system 1040 includes a set of one or more servers that are running on server electronic devices and that are configured to handle requests for any authorized user associated with any tenant (there is no server affinity for a user and/or tenant to a specific server). The user electronic devices 1080A-S communicate with the server(s) of system 1040 to request and update tenant-level data and system-level data hosted by system 1040, and in response the system 1040 (e.g., one or more servers in system 1040) automatically may generate one or more Structured Query Language (SQL) statements (e.g., one or more SQL queries) that are designed to access the desired information from the one or more multi-tenant database 1046 and/or system data storage 1050.

In some implementations, the service(s) 1042 are implemented using virtual applications dynamically created at run time responsive to queries from the user electronic devices 1080A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 1060 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 1044 includes an application setup mechanism that supports application developers' creation and management of applications, which may be saved as metadata by save routines. Invocations to such applications, including the transaction queue 104A, the tenant level objects 104B, the network level objects 104C, and the blockchain services 104D, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 1082 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 1040 and the user electronic devices 1080A-S.

Each user electronic device 1080A-S (such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 1040. For example, the user interface device can be used to access data and applications hosted by system 1040, and to perform searches on stored data, and otherwise allow a user 1084 to interact with various GUI pages that may be presented to a user 1084. User electronic devices 1080A-S might communicate with system 1040 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 1080A-S might include an HTTP client, commonly referred to as a "browser," for sending and receiving HTTP messages to and from server(s) of system 1040, thus allowing users 1084 of the user electronic device 1080A-S to access, process and view information, pages and applications available to it from system 1040 over network 1082.

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method for managing data, by a multi-tenant server in a distributed network, wherein the multi-tenant server manages a multi-tenant environment for a set of tenant systems and peers in the distributed network, which include the set of tenant systems and a set of non-tenant systems, the method comprising:
   receiving, by the multi-tenant server, a tenant transaction request to modify an object in the distributed network, wherein the tenant transaction request is received from a tenant system in the set of tenant systems and is based on a non-tenant transaction request that is received from a non-tenant system from the set of non-tenant systems;
   generating, by the multi-tenant server on behalf of the tenant system and the non-tenant system, a transaction object based on an exchange object and the tenant transaction request; and
   making, by the multi-tenant server on behalf of the tenant system, the transaction object available to the set of tenant systems and the set of non-tenant systems in the distributed network to attempt to obtain consensus for modifying the object in the distributed network.

2. The method of claim 1, further comprising:
   determining, by the multi-tenant server based on approvals from the set of tenant systems and the set of non-tenant systems in the distributed network, that consensus has been reached in the distributed network for the transaction object, including modifying the object in the distributed network.

3. The method of claim 2, wherein the multi-tenant server includes blockchain services for providing approval for the transaction object on behalf of the set of tenant systems.

4. The method of claim 3, wherein the set of non-tenant systems provide approval for the transaction object separate from the blockchain services of the multi-tenant server.

5. The method of claim 2, further comprising:
   committing, in response to determining consensus, modification to the object in the distributed network; and
   adding, in response to determining consensus, a block to peer-ledgers of the systems in the distributed network based on committing the modification to the object in the distributed network.

6. The method of claim 5, wherein the peer-ledgers of the non-tenant systems include a sub-set of blocks that are included in the peer-ledgers of the tenant systems.

7. The method of claim 1, wherein the tenant system is associated with the non-tenant system for handling the non-tenant transaction request when the peer-to-peer distributed network is established or when the non-tenant system joins the peer-to-peer distributed network.

8. The method of claim 1, further comprising:
   generating, by the multi-tenant server, the exchange object for the distributed network, wherein the exchange object includes a set of exchange fields and a mapping between each exchange field in the set of exchange fields and a field of objects associated with each tenant system in the set of tenant systems,
   wherein the transaction object includes a set of field values for the set of exchange fields based on the tenant transaction request.

9. A non-transitory machine-readable storage medium, including instructions that when executed by a processor of a multi-tenant server, cause the processor to:
   receive a tenant transaction request to modify an object in a distributed network, wherein the multi-tenant server manages a distributed network and a multi-tenant environment for a set of tenant systems and peers in the distributed network, which include the set of tenant systems and a set of non-tenant systems, wherein the tenant transaction request is received from a tenant system in the set of tenant systems and is based on a non-tenant transaction request that is received from a non-tenant system from the set of non-tenant systems;
   generate, on behalf of the tenant system and the non-tenant system, a transaction object based on an exchange object and the tenant transaction request; and
   make, on behalf of the tenant system, the transaction object available to the set of tenant systems and the set of non-tenant systems in the distributed network to attempt to obtain consensus for modifying the object in the distributed network.

10. The non-transitory machine-readable storage medium of claim 9, wherein the instructions further cause the processor to:
    determine, based on approvals from the set of tenant systems and the set of non-tenant systems in the distributed network, that consensus has been reached in the distributed network for the transaction object, including modifying the object in the distributed network.

11. The non-transitory machine-readable storage medium of claim 10, wherein the multi-tenant server includes blockchain services for providing approval for the transaction object on behalf of the set of tenant systems.

12. The non-transitory machine-readable storage medium of claim 11, wherein the set of non-tenant systems provide approval for the transaction object separate from the blockchain services of the multi-tenant server.

13. The non-transitory machine-readable storage medium of claim 10, wherein the instructions further cause the processor to:
    commit, in response to determining consensus, modification to the object in the distributed network; and add, in response to determining consensus, a block to peer-ledgers of the systems in the distributed network based on committing the modification to the object in the distributed network.

14. The non-transitory machine-readable storage medium of claim 13, wherein the peer-ledgers of the non-tenant systems include a sub-set of blocks that are included in the peer-ledgers of the tenant systems.

15. The non-transitory machine-readable storage medium of claim 9, wherein the tenant system is associated with the non-tenant system for handling the non-tenant transaction request when the peer-to-peer distributed network is established or when the non-tenant system joins the peer-to-peer distributed network.

16. The non-transitory machine-readable storage medium of claim 9, wherein the instructions further cause the processor to:
generate the exchange object for the distributed network, wherein the exchange object includes a set of exchange fields and a mapping between each exchange field in the set of exchange fields and a field of objects associated with each tenant system in the set of tenant systems,
wherein the transaction object includes a set of field values for the set of exchange fields based on the tenant transaction request.

17. A multi-tenant server to manage data in a distributed network, wherein the multi-tenant server manages a multi-tenant environment for a set of tenant systems and peers in the distributed network, which include the set of tenant systems and a set of non-tenant systems, the multi-tenant server comprising:
a processor;
a memory storing instruction that when executed by the processor cause the processor to:
receive a tenant transaction request to modify an object in a distributed network, wherein the multi-tenant server manages a distributed network and a multi-tenant environment for a set of tenant systems and peers in the distributed network, which include the set of tenant systems and a set of non-tenant systems, wherein the tenant transaction request is received from a tenant system in the set of tenant systems and is based on a non-tenant transaction request that is received from a non-tenant system from the set of non-tenant systems;
generate, on behalf of the tenant system and the non-tenant system, a transaction object based on an exchange object and the tenant transaction request; and
make, on behalf of the tenant system, the transaction object available to the set of tenant systems and the set of non-tenant systems in the distributed network to attempt to obtain consensus for modifying the object in the distributed network.

18. The multi-tenant server of claim 17, wherein the instructions further cause the processor to:
determine, based on approvals from the set of tenant systems and the set of non-tenant systems in the distributed network, that consensus has been reached in the distributed network for the transaction object, including modifying the object in the distributed network.

19. The multi-tenant server of claim 18, wherein the multi-tenant server includes blockchain services for providing approval for the transaction object on behalf of the set of tenant systems, and
wherein the set of non-tenant systems provide approval for the transaction object separate from the blockchain services of the multi-tenant server.

20. The multi-tenant server of claim 18, wherein the instructions further cause the processor to:
commit, in response to determining consensus, modification to the object in the distributed network; and
add, in response to determining consensus, a block to peer-ledgers of the systems in the distributed network based on committing the modification to the object in the distributed network,
wherein the peer-ledgers of the non-tenant systems include a sub-set of blocks that are included in the peer-ledgers of the tenant systems.

\* \* \* \* \*